United States Patent
Lindholm

[11] Patent Number: 5,667,332
[45] Date of Patent: Sep. 16, 1997

[54] LOCKING DEVICE FOR A DRIVE SHAFT

[75] Inventor: Tage Lindholm, Norrköping, Sweden

[73] Assignee: Aktiebolaget Electrolux, Stockholm, Sweden

[21] Appl. No.: 554,742

[22] Filed: Nov. 7, 1995

[30] Foreign Application Priority Data

Jan. 25, 1995 [DE] Germany .................. 295 01 158.0

[51] Int. Cl.$^6$ .................. F16B 21/18; F16D 1/06; B23P 19/08
[52] U.S. Cl. .................. 403/359; 403/326; 403/327
[58] Field of Search .................. 403/359, 327, 403/326, DIG. 7

[56] References Cited

U.S. PATENT DOCUMENTS

| | | |
|---|---|---|
| 3,527,120 | 9/1970 | Duer et al. .................. 403/359 X |
| 4,261,668 | 4/1981 | Rigal .................. 403/359 X |
| 4,365,696 | 12/1982 | Telford .................. 403/326 X |
| 5,499,884 | 3/1996 | Kuhnhold et al. .................. 403/359 X |

FOREIGN PATENT DOCUMENTS 339380  11/1989  European Pat. Off. ............... 403/359

*Primary Examiner*—Anthony Knight
*Attorney, Agent, or Firm*—Pearne, Gordon, McCoy & Granger LLP

[57] ABSTRACT

In a locking device for interconnecting a drive shaft (10) and a coupling sleeve (11), a resilient locking ring (14) is provided which engages in grooves (13, 15) on the shaft and sleeve, respectively. The shaft and sleeve have splines (12) for transmitting a driving torque. The groove (13) of the shaft is spaced from the splines and has a bevel at the side facing the splines, and the sleeve has an inner bevel (16) at its end for compressing the locking ring during assembly.

5 Claims, 1 Drawing Sheet

LOCKING DEVICE FOR A DRIVE SHAFT

BACKGROUND OF THE INVENTION

The present invention relates to a locking device for a drive shaft of a power driven tool such as a brush cutter or grass trimmer.

The locking device is used for permanently interlocking a coupling sleeve and a drive shaft. Tools of the mentioned type comprise a relatively long tube enclosing a drive shaft and extending between an engine and a cutting tool. For the purpose of transportation it is preferable that the tube can be disassembled. To this end, the tube and the drive shaft comprise two releasably interconnected parts. The coupling sleeve is permanently connected to one of the shaft parts and releasably connected to the other. For transmitting the driving power from the engine the sleeve and the shaft parts are provided with splines in a conventional manner.

BRIEF DESCRIPTION OF THE DRAWINGS

The invention will be discribed in more detail in the following with reference to the accompanying drawing, in which.

DETAILED DESCRIPTION OF PREFERRED EMBODIMENTS

Figure 1:
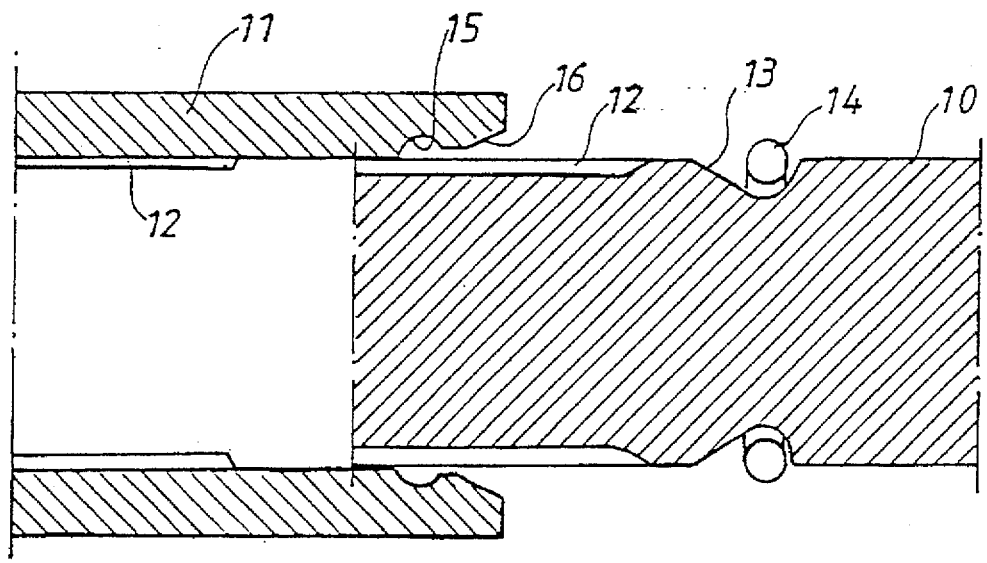
FIG. 1 is a longitudinal section of the locking device according to the invention in a disassembled position.
Figure 3:
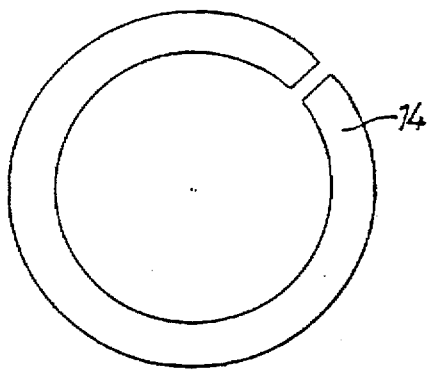
FIG. 3 is a plan view of a locking ring.

In the drawing, a shaft 10 and a coupling sleeve 11 are partially shown. The shaft and the sleeve are both provided with intermeshing splines 12 for transmitting a driving torque. At a position spaced from the splines the shaft 10 has a circumferential groove 13 receiving a resilient locking ring 14. As can be seen, the groove 13 is bevelled about 30° on one side.

Figure 2:
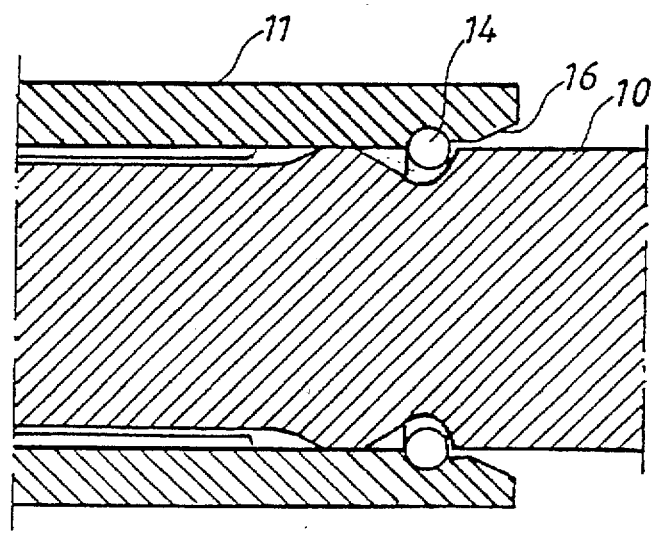
FIG. 2 is a corresponding view of the device in an assembled position.

The sleeve 11 has a corresponding groove 15 and a bevel 16 at its end for facilitating the assembly. When the sleeve is pushed onto the shaft the locking ring is compressed by the bevel 16 to allow the sleeve to be moved to the position shown in FIG. 2 in which the locking ring engages the groove 15 of the sleeve and interconnects the shaft and the sleeve. In this position the shaft and sleeve are permanently attached to each other since any attempt to withdraw the sleeve will result in the locking ring being pressed radially outwards by the bevelled groove 13 of the shaft. Thus the ring will engage firmly in the groove 15 of the sleeve 11 which prevents disassembly of the interconnected elements.

By disposing the locking ring 14 outside the splines, the locking ring will withstand greater axial forces since if disposed within the splines area the ring would tend to be sheared or deformed when exposed to heavy axial forces.

What is claimed is:

1. Locking device for interconnecting a drive shaft (10) and a coupling sleeve (11), said locking device comprising a resilient locking ring (14) engaging in grooves (13, 15) provided in the shaft and sleeve respectively, said shaft and sleeve having splines (12) for transmitting a driving torque, wherein said groove (13) of the shaft is axially spaced apart from the splines and has a bevel at the side of the groove facing the splines, and said sleeve has an inner bevel (16) at an opening of the sleeve for compressing the locking ring during insertion of said shaft through said opening and into said sleeve.

2. The locking device according to claim 1, wherein said groove (15) of the sleeve is axially spaced apart from the splines.

3. The locking device according to claim 1, wherein said ring has a circular cross-section.

4. The locking device according to claim 1, wherein said sleeve has only one groove for receiving said locking ring.

5. The locking device according to claim 1, wherein said groove of said shaft is axially spaced apart from said splines by a generally cylindrically-shaped surface.

* * * * *